July 25, 1939.  W. STACK  2,166,978
DUAL CONTROL ATTACHMENT FOR AUTOMOBILES
Original Filed April 21, 1937
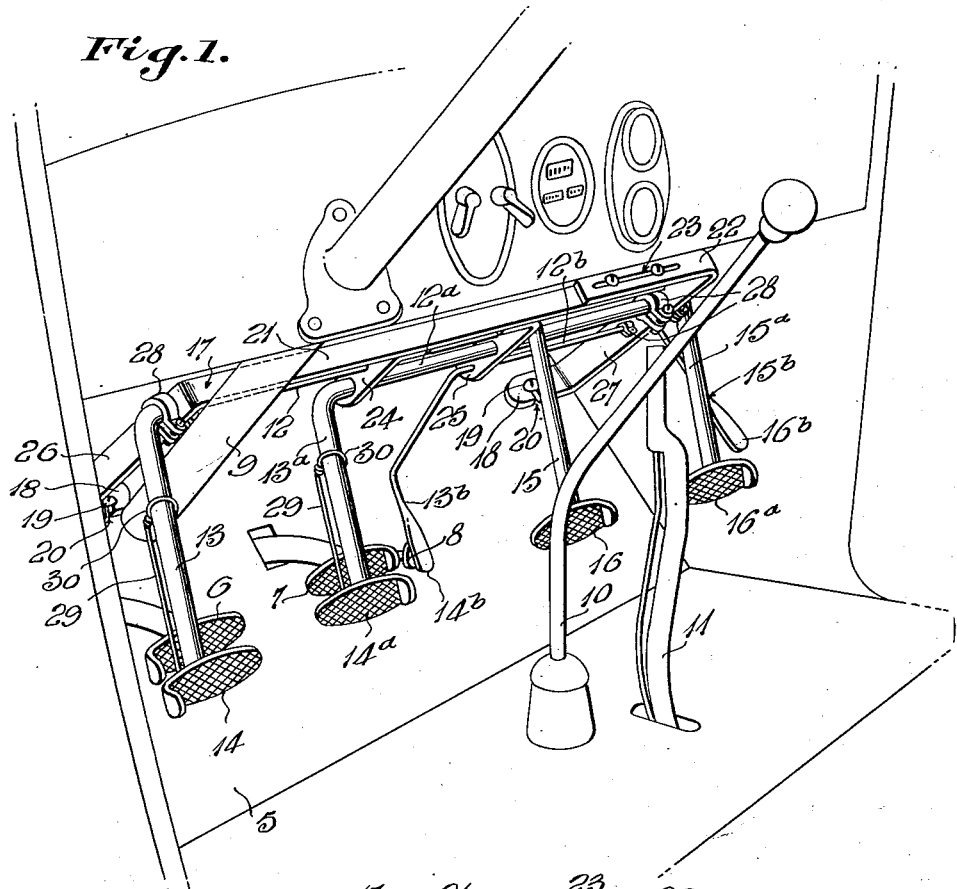
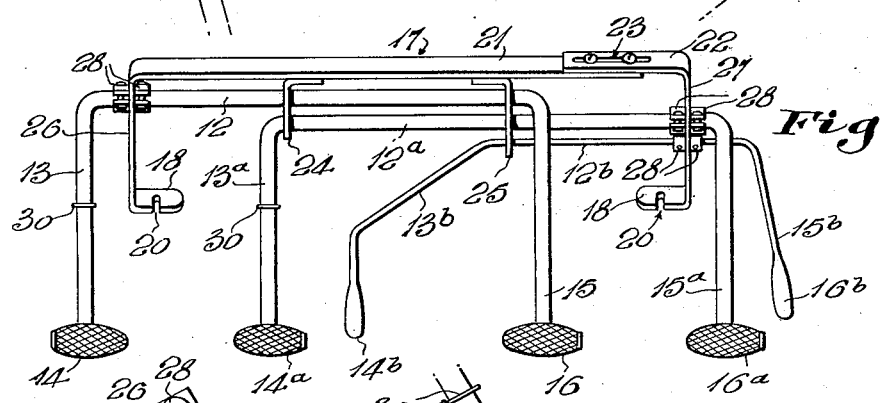
Inventor
William Stack
By H. D. Willson & Co.
Attorneys Patented July 25, 1939

2,166,978

UNITED STATES PATENT OFFICE 2,166,978

DUAL CONTROL ATTACHMENT FOR AUTOMOBILES

William Stack, Susquehanna, Pa.

Application April 21, 1937, Serial No. 138,234
Renewed October 21, 1938

9 Claims. (Cl. 74—480)

The invention relates to a novel attachment whereby an instructor teaching a novice to drive an automobile may himself operate the clutch, brake and accelerator in any required manner, either in emergency or for purposes of instruction.

One object of the invention is to provide a novel attachment which may be quickly and easily applied as a single unit, and may be removed with equal speed and ease, enabling attachment of the device to any car without delay, and permitting easy removal of said device when no longer needed, and easy transfer of said device from one car to another.

Another object is to provide an attachment of the stated nature which requires no removal of floor boards and no mutilation of the car to which it is to be attached, it being only necessary to drill two bolt holes through the foot-board to receive the attaching bolts.

A further object is to provide an attachment which is readily adjustable for application to cars of different makes.

A still further aim is to provide such a construction and relation of parts that the attachment does not obstruct the foot room of the driver and instructor and cannot therefore interfere with the necessary foot movements.

Yet another aim is to provide a construction which will be free from objectionable rattling.

A still further aim is to provide an attachment which may be easily and inexpensively manufactured and therefore profitably sold at a fair price.

With the foregoing in view, the invention resides in the novel subject matter hereinafter described and claimed, description being accomplished by reference to the accompanying drawing.

Fig. 1 is a perspective view showing the attachment applied to an automobile.

Fig. 2 is a rear elevation of the attachment removed from the car.

Fig. 3 is an end elevation with the footboard in section.

Fig. 4 is a fragmentary side elevation showing one of the anti-rattlers.

The form of construction selected for illustration, will be rather specifically described, with the understanding however, that variations may be made within the scope of the invention as claimed.

The invention is shown upon an automobile having the usual inclined foot-board 5, and the customary clutch pedal 6, brake pedal 7 and accelerator button or pedal 8, all passing through said foot-board. 9 denotes a portion of the steering column, 10 the usual gear shift lever and 11 the hand-brake lever.

I mount three transverse rock shafts 12, 12ª and 12ᵇ above the foot-board 5, at such an elevation that they will not interfere with the foot room of the driver or the instructor seated beside him. At their left ends, these rock shafts are provided with downwardly hanging arms 13, 13ª and 13ᵇ respectively, these arms being integrally joined to the shafts or otherwise secured thereto and being adapted to rest upon the pedals 6, 7 and 8 respectively. The lower ends of these arms are provided with suitably shaped foot-plates 14, 14ª and 14ᵇ to be operated by the driver's feet to in turn operate the pedals 6, 7 and 8. At the right ends of the shafts, said shafts are provided with additionally downwardly hanging arms 15, 15ª and 15ᵇ respectively, these arms being integral with the shafts or otherwise suitably secured thereto. At their lower ends, the arms 15, 15ª and 15ᵇ are provided with appropriate foot-plates 16, 16ª, 16ᵇ for the use of the instructor, enabling him to independently operate any of the rock-shafts to control the clutch, brake and accelerator in any required manner. Thus, as the instructor may readily handle the steering wheel, he has as much control of the car as if he were seated in the driver's seat.

In the preferred construction, I provide an arched bracket frame 17 for mounting the three shafts 12, 12ª and 12ᵇ, the ends of said frame being provided with laterally projecting feet 18 to be fastened to the foot-board 5 by two bolts 19, said feet preferably having mere notches 20 to receive said bolts, allowing unusually quick detachment of the frame simply by loosening the bolts. These bolts may then be entirely removed or may be left in position for future use.

The frame 17 is preferably constructed of two sections 21 and 22 adjustably secured together at 23, permitting changing of the width of said frame with ease, when applying it to one make of car or another.

The arched frame 17 preferably includes two downwardly projecting bracket arms 24 and 25 which are secured to the upper or crown portion of said frame and are instrumental in mounting the rock-shafts. The shaft 12 passes through an opening in one leg 26 of the frame 17 and through openings in both bracket arms 24 and 25. The shaft 12ª passes through an opening in the other leg 27 of the frame 17, and through openings in both bracket arms 24 and 25. The shaft 12ᵇ passes through openings in the leg 27 and the bracket arm 25. All of these shafts are slidably adjustable as may be required when applying the control unit to different makes of cars, and to hold said shafts against longitudinal movement out of adjustment, I prefer to provide them with suitable clamped-on collars 28 at positions to abut suitable portions of the frame 17.

In addition to the features above described, I prefer to provide the arms 13 and 13ᵃ with anti-rattling springs 29 to engage the pedals 6 and 7, preventing objectionable rattling from road vibration. Each anti-rattling spring 29 may well be formed from a single length of spring wire bent to form a loop 30 at one of its ends to surround the arm 13 or 13ᵃ, the wire, toward its other end, being provided with two coils 31 and 32, one of which receives a bolt 33 used in attaching the foot-plate 14 or 14ᵃ. The terminal of the wire after forming the coil 32, may well rest against the foot-plate as seen at 34, not only holding the wire itself under tension but holding said foot-plate against any possible rattling upon the bolt 33.

By providing the novel construction shown and described, a practicable device is provided for carrying out the objects of the invention, and while the details disclosed may well be followed, variations may of course be made within the scope of the invention as claimed, it being of course understood that I am not restricted to size, proportions, materials, finish, etc.

I claim:

1. In combination with an automobile having the usual inclined foot-board, seat behind said foot-board and clutch, brake and accelerator pedals extending through said foot-board; three independent transverse rock shafts spaced sufficiently above said foot-board to be out of the way of the feet of persons sitting on said seat, mounting means for said rock shafts, three downwardly hanging arms secured one to each of said rock shafts at the left end thereof and resting one on each of said pedals, said downwardly hanging arms having foot plates operable by the driver to actuate said pedals, and three additional downwardly hanging arms secured one to each of said rock shafts at the right end thereof and having foot plates to be operated in emergency by an instructor seated beside the driver.

2. In combination with an automobile having the usual inclined foot-board, seat behind said foot-board and clutch, brake and accelerator pedals extending through said foot-board; three independent transverse rock shafts spaced sufficiently above said foot-board to be out of the way of the feet of persons sitting on said seat, an arched bracket frame upon which said rock shafts are mounted, the ends of said bracket frame being provided with feet detachably secured to a part of the automobile, three downwardly hanging arms secured one to each of said rock shafts at the left end thereof and resting one on each of said pedals, said downwardly hanging arms having foot plates operable by the driver to actuate said pedals, and three additional downwardly hanging arms secured one to each of said rock shafts at the right end thereof and having foot plates to be operated in emergency by an instructor seated beside the driver.

3. A dual control attachment for an automobile comprising three independent transverse rock shafts, means for mounting said rock shafts sufficiently above the usual inclined foot-board of an automobile as to be out of the way of the feet of persons sitting upon the seat, three downwardly hanging arms secured one to each of said rock shafts at the left end thereof to rest upon the usual clutch, brake and accelerator pedals, said downwardly hanging arms being provided with foot plates to be used by the driver in operating said pedals, and three additional downwardly hanging arms secured one to each of said rock shafts at the right end thereof and having foot plates to be operated in emergency by an instructor seated beside the driver.

4. A dual control attachment for an automobile comprising independent transverse rock shafts, an arched bracket frame upon which said rock shafts are mounted, the ends of said bracket frame having attaching feet, said frame being of such height as to mount said rock shafts sufficiently above the usual foot-board as to be out of the way of the feet of persons sitting upon the seat, three downwardly hanging arms secured one to each of said rock shafts, at the left end thereof to rest upon the usual brake, clutch and accelerator pedals, said downwardly hanging arms being provided with foot plates to be used by the driver in operating said pedals, and three additional downwardly hanging arms secured one to each of said rock shafts, at the right end thereof and having foot plates to be operated in emergency by an instructor seated beside the driver.

5. A structure as specified in claim 4; said bracket frame being formed of adjustably connected sections for changing the width of said bracket frame as required when applying the attachment to cars of different makes.

6. A dual control attachment for an automobile comprising a horizontally elongated arched frame to extend transversely of the automobile body over the foot board, the legs of said arched frame being provided at their lower ends with feet to be bolted to the foot board, the crown portion of said arched frame being provided with two downwardly projecting bracket arms spaced from each other and spaced from the legs of said frame, a clutch operating rock shaft passing through both of said bracket arms and through the leg at the left end of the frame, a brake operating rock shaft passing through both of said bracket arms and through the leg at the right end of the frame, an accelerator operating rock shaft passing through said right leg and the bracket arm nearest thereto, three downwardly hanging arms secured to the left ends of said rock shafts respectively to rest upon the usual clutch, brake and accelerator pedals and three additional downwardly hanging arms secured to the right ends of said rock shafts respectively, the first mentioned downwardly hanging arms being provided with foot plates operable by the driver to operate the clutch, brake and accelerator pedals, said additional downwardly hanging arms being also provided with foot plates to be operated by an instructor seated beside the driver.

7. In an attachment of the class described having a pedal-operating arm, a foot plate over said arm, and a bolt passing transversely through said arm for attaching said foot plate thereto; a length of resilient wire under said arm and extending longitudinally thereof to rest yieldably on the pedal to be operated, one end of said wire being provided with a loop surrounding said arm and spaced longitudinally of the latter from said foot plate, the other end portion of said wire being coiled around said bolt and extended from the coil into contact with the lower side of said foot plate preventing the latter from rattling upon said bolt.

8. A dual control unit adapted to be disposed entirely above the floor and foot board of an automobile, and quickly applicable and releasable fasteners for securing said unit in place in such manner as to not mutilate the automobile and to permit quick and easy removal of the entire unit when desired, said unit having a left set of clutch, brake and accelerator pedals to lie upon the usual clutch, brake and accelerator pedals of the automobile for actuation by a novice driver seated behind the steering wheel, and a right set of clutch brake and accelerator pedals connected to said left set of pedals for actuation by an instructor seated beside the novice.

9. A dual control unit adapted to be disposed entirely above the floor and foot board of an automobile, and quickly applicable and releasable fasteners for securing said unit in place in such manner as to not mutilate the automobile and to permit quick and easy removal of the entire unit when desired, said unit having a left set of clutch, brake and accelerator pedals to lie upon the usual clutch, brake and accelerator pedals of the automobile for actuation by a novice driver seated behind the steering wheel, a right set of clutch, brake and accelerator pedals for actuation by an instructor seated beside the novice, and three rock shafts connecting the two clutch pedals, the two brake pedals and the two accelerator pedals respectively, said three rock shafts being all disposed in closely spaced parallel relation with each other.

WILLIAM STACK.